(12) United States Patent
Higuchi et al.

(10) Patent No.: US 8,514,537 B2
(45) Date of Patent: Aug. 20, 2013

(54) POWER SUPPLY CONTROLLER

(75) Inventors: Yutaka Higuchi, Yokkaichi (JP); Seiji Takahashi, Yokkaichi (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 13/496,386

(22) PCT Filed: Sep. 24, 2010

(86) PCT No.: PCT/JP2010/066515
§ 371 (c)(1),
(2), (4) Date: Mar. 15, 2012

(87) PCT Pub. No.: WO2011/037170
PCT Pub. Date: Mar. 31, 2011

(65) Prior Publication Data
US 2012/0182004 A1 Jul. 19, 2012

(30) Foreign Application Priority Data
Sep. 25, 2009 (JP) .................................. 2009-221392

(51) Int. Cl.
*H02H 5/04* (2006.01)
(52) U.S. Cl.
USPC ......................................... 361/103; 361/93.8
(58) Field of Classification Search
USPC ........................................................ 361/103
See application file for complete search history.

(56) References Cited

U.S. PATENT DOCUMENTS 6,989,976 B2 1/2006 Ashiya
7,088,565 B2 8/2006 Watanabe et al.
7,640,080 B2 * 12/2009 Nakamura et al. ............ 700/299
(Continued)

FOREIGN PATENT DOCUMENTS
JP    A-2003-189460    7/2003
JP    A-2004-7970     1/2004
(Continued)

OTHER PUBLICATIONS

Dec. 21, 2010 International Search Report issued in International Patent Application No. PCT/JP2010/066515 (with translation).
(Continued)

*Primary Examiner* — Dharti Patel
(74) *Attorney, Agent, or Firm* — Oliff & Berridge, PLC (57) ABSTRACT

A power supply controller includes a switch circuit to be provided between the power source and power supply path, the switch circuit switches the power supply from the power source to the load between on and off, and a power-supply-path protection circuit. The power-supply-path protection circuit controls switching operation of the switch circuit according to a power-supply command signal that commands to start or terminate the power supply to the load, to calculate a temperature of the power-supply path, and if the calculated temperature reaches a predetermined upper limit, to inhibit the switch circuit from the power supply, thereby protecting the power-supply path. In a case where the power supply by the switch circuit is inhibited, if the temperature of the power supply path decreases to a predetermined threshold temperature, the power-supply-path protection circuit removes inhibition of the power supply by the switch circuit.

10 Claims, 3 Drawing Sheets

(56) References Cited

U.S. PATENT DOCUMENTS

| | | |
|---|---|---|
| 7,848,071 B2 | 12/2010 | Takahashi et al. |
| 2003/0123205 A1 | 7/2003 | Ashiya |
| 2004/0201938 A1 | 10/2004 | Watanabe et al. |
| 2007/0146951 A1 | 6/2007 | Takahashi et al. |
| 2007/0253132 A1 | 11/2007 | Nakamura et al. |
| 2010/0254059 A1 | 10/2010 | Higuchi et al. |

FOREIGN PATENT DOCUMENTS

| | | |
|---|---|---|
| JP | A-2007-174490 | 7/2007 |
| JP | A-2007-295776 | 11/2007 |
| JP | A-2009-130944 | 6/2009 |

OTHER PUBLICATIONS

Dec. 21, 2010 Written Opinion of the International Searching Authority issued in International Patent Application No. PCT/JP2010/066515 (with translation).

* cited by examiner

POWER SUPPLY CONTROLLER

TECHNICAL FIELD

The present invention, relates to a power supply controller and, more particularly to, a technique for recovering power supply to a load after it is shut off.

BACKGROUND ART

Conventionally, a power supply controller has been provided which includes a high-power semiconductor switch element, such as, for example, a power MOSFET along a power supply path which connects a power source and a load with each other and controls supply of a current to the load by turning this semiconductor switch element on/off and also protects the power supply path to the load from an overcurrent. Such a type of the power supply controller is known that if an overcurrent flows, the potential of a control terminal of the semiconductor switch element is controlled using a control circuit to turn off this semiconductor switch element, thereby shutting off power supply (see Patent Document 1). Further, in this document, a technique is disclosed for providing a shut off time counter (timer circuit) for measuring a predetermined shut off time in order to recover once shut off power supply on condition that the timer circuit has timed out.

Patent Document 1 Japanese Patent Application Laid-Open No. 2007-174490

DISCLOSURE OF THE PRESENT INVENTION

Problem to be Solved by the Invention

However, in the case of recovering power supply by using the timer circuit, if the shutoff time is long, the scale of the timer circuit increases as the measured time increases. Therefore, for a power supply controller which controls power supply to a plurality of loads, an increase in size of the timer circuit has been an obstacle to miniaturization of this controller. Further, to change the shutoff time in relation to the protection of the power supply path, it has been necessary to change the setting of time to be measured by the timer circuit. It has led to a demand for a power supply controller which can easily recover once shut off power supply while securely protecting the power supply path.

Means for Solving Problems

The present invention was achieved in view of the foregoing circumstances. The power supply controller according to the present invention is connected to a power supply path for supplying power from a power source to a load. The power supply controller is configured to control power supply from the power source to the load. The power supply controller includes a switch circuit to be provided between the power source and the power supply path, the switch circuit being configured to switch the power supply from the power source to the load between on and off; and a power-supply-path protection circuit configured to control switching operation of the switch circuit according to a power-supply command signal that commands to start or terminate the power supply to the load, to calculate a temperature of the power-supply path, and if the calculated temperature reaches a predetermined upper limit, to inhibit the switch circuit from the power supply, thereby protecting the power-supply path. In a case where the power supply by the switch circuit is inhibited, if the temperature of the power supply path decreases to a predetermined threshold temperature, the power-supply-path protection circuit removes inhibition of the power supply by the switch circuit.

According to this configuration, once shut off power supply is recovered on the basis of the temperature of the power supply path (wire) without using a timer circuit for measuring time during which power supply is inhibited (shut off). As a result, it is possible to easily recover once shut off power supply while securely protecting the power supply path.

DESCRIPTION OF REFERENCE NUMERALS

10: Power supply controller
11: Printed circuit board
20: Power-supply-path protection circuit
21: Power supply determination control circuit
22: Wire temperature calculation circuit
23: Current detection circuit (current detection means)
24: Ambient temperature sensor (temperature detection means)
30: Switch circuit
31: Main switch (switch circuit)
32: Sense transistor (current detection means)
50: Fan motor (load)
51: Power supply path
51A: Printed wiring portion (power supply path)
51B: Wire portion (power supply path)
I: Flowing current
Ta: Ambient temperature
Tth: Threshold temperature
Tw: Wire temperature (temperature of power supply path)
ΔTw: Increase in the wire temperature (increase in temperature of power supply path)
ΔT_lower: increase for determination (predetermined temperature, value)

BEST MODE FOR CARRYING OUT THE INVENTION

Embodiment

Figure 1:
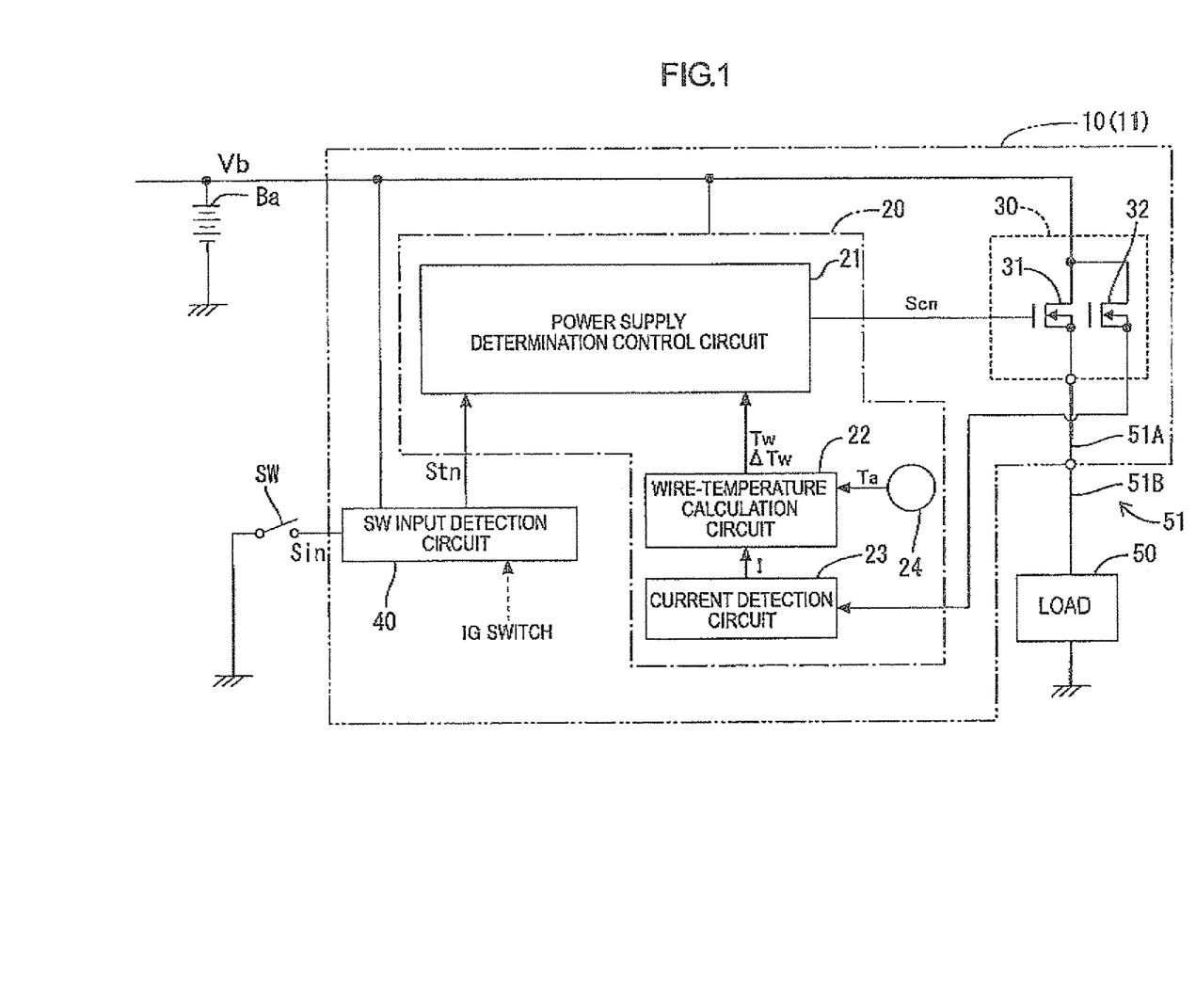
FIG. 1 is an outlined block diagram of a power supply controller according to one embodiment of the present invention.
Figure 2:
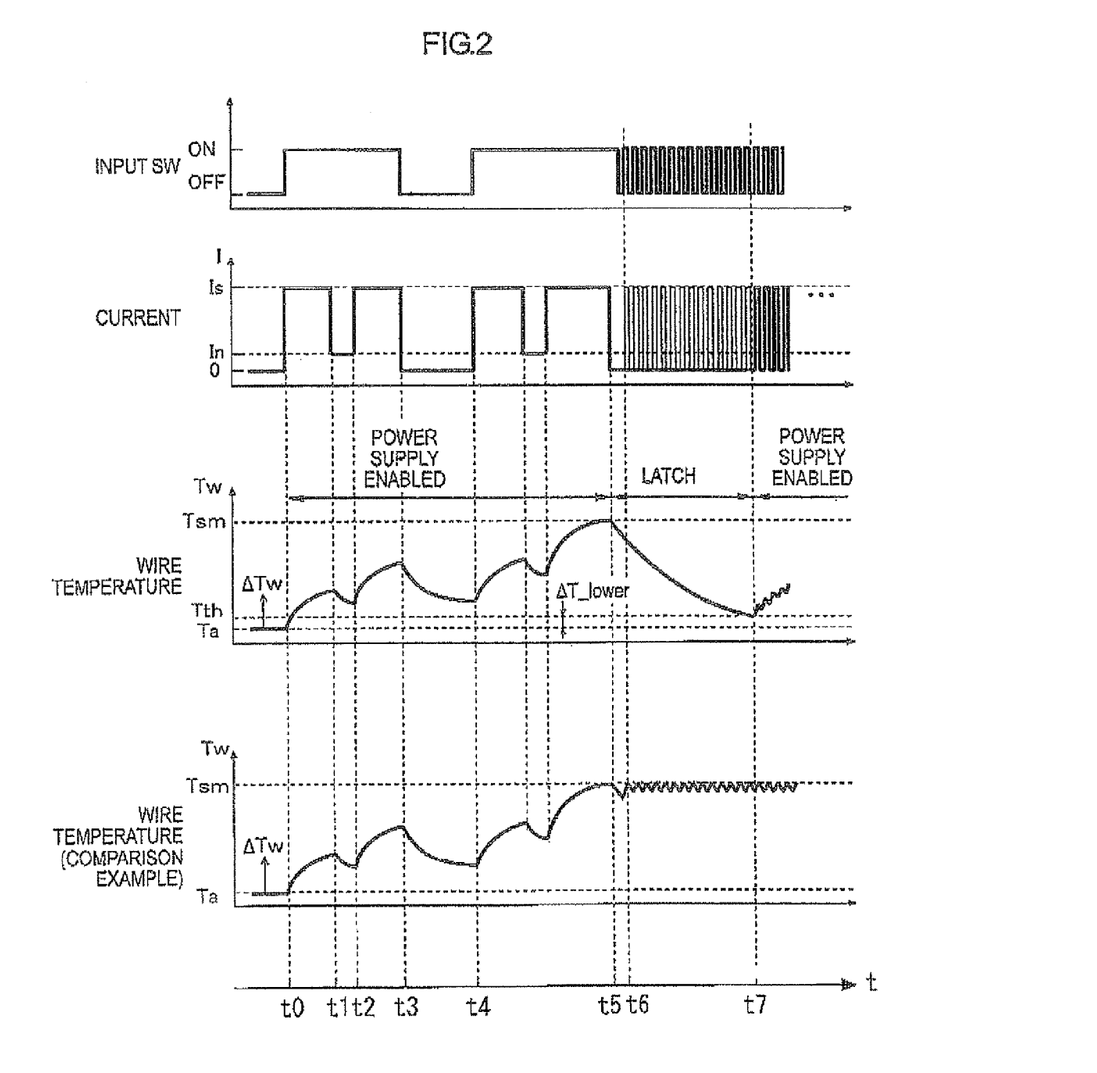
FIG. 2 is a timing chart schematically showing time transition of each signal according to the embodiment.
Figure 3:
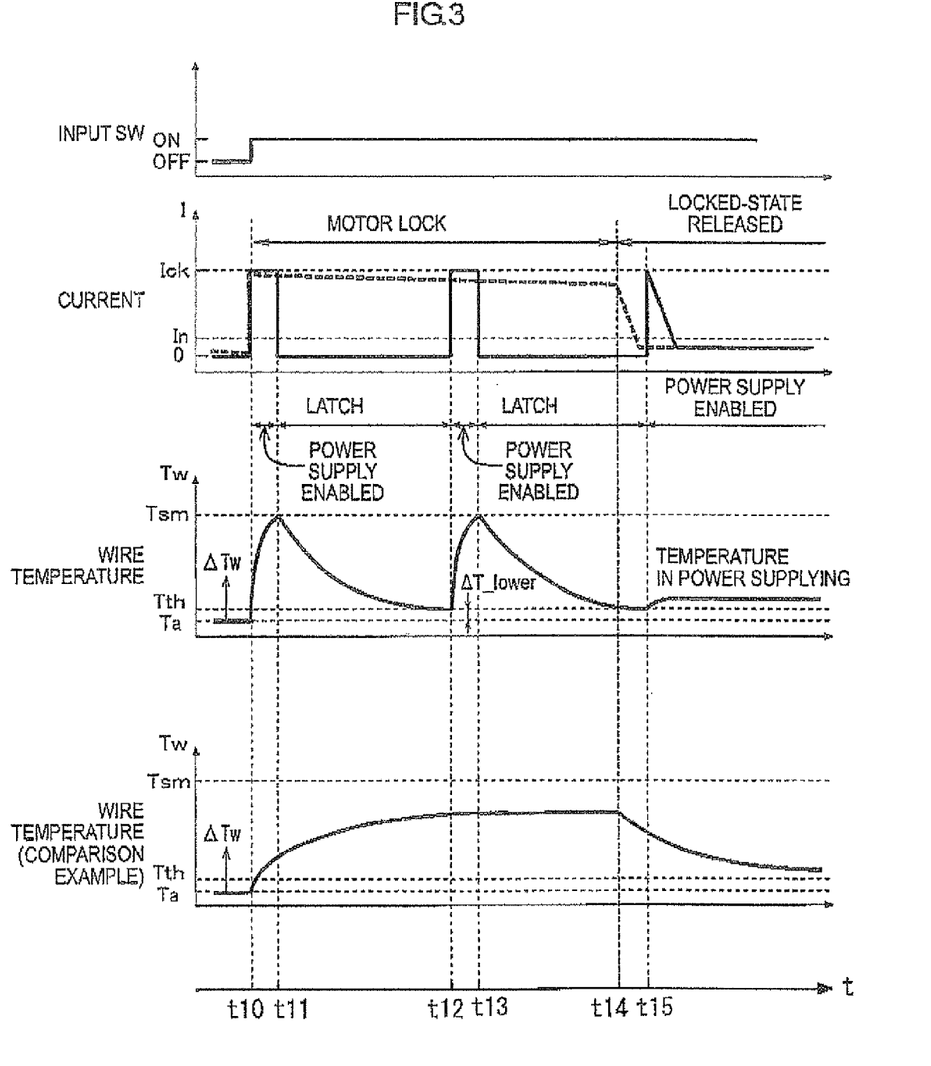
FIG. 3 is a timing chart schematically showing time transition of each signal in a case where a motor is locked.

A description will be given of an embodiment of the present invention with reference to FIGS. 1 to 3. FIG. 1 is an outlined block diagram of a power supply controller 10 according to an embodiment of the present invention. FIG. 2 is a timing chart showing time transition of each signal according to the embodiment. FIG. 3 is a timing chart showing time transition of each signal according to the present embodiment in a case where a motor is a load.

1. Circuit Configuration

As shown in FIG. 1, the power supply controller 10 is connected to a power supply path 51 which supplies power from a power source Ba to a load 50 at a position between the power source Ba and the load 50, thereby controlling supply of power from the power source Ba to the load 50.

The power supply controller 10 in general includes a switch (SW) input detection circuit 40, a switch circuit 30, and a power-supply-path protection circuit 20. The power supply controller 10 is formed on a printed circuit board 11, and the power supply path 51 includes a printed wiring portion 51A formed on the printed circuit board 11 and a wire portion (hereinafter referred to as "wire" simply) 51B which connects the printed wiring portion 51A and the load 50 to each other.

In the present embodiment, the power supply controller 10 is shown in an example where it is disposed in the engine room of an automobile. The power source Ba is a battery, and as the load 50, for example, a fan motor is shown in an example where it is drive-controlled by the power supply controller 10 via the power supply path 51. In FIG. 1, a battery voltage Vb is directly applied to the switch circuit 30, whereas to the power-supply-path protection circuit 20 and the SW input detection circuit 40, the battery voltage Vb is converted by a voltage converter (not shown) into a predetermined voltage and applied.

In addition to its application to the present embodiment, the power supply controller of the present invention can be applied to all types of power supply controllers which are used to control supply of power to the load and protect a power supply path. The load is not limited to the motor either.

The SW input detection circuit 40 is connected to an input switch SW. If the input switch SW is turned on, the SW input detection circuit 40 receives an input signal (power supply command signal) Sin which commands to start the power supply to the load 50 and generates an output command signal (power supply command signal) Stn. That is, in the present embodiment, start of power supply to the load 50 is commanded by turning on the input switch SW.

If the input switch SW is turned off, the SW input detection circuit 40 receives the input signal Sin which commands to terminate the power supply to the load 50.

The switch circuit 30 is provided between the battery Ba and the power supply path 51, to switch the power supply from the battery Ba to the load 50 between on and off according to a power supply control signal Son from the power-supply-path protection circuit 20. This switch circuit 30 is configured as a semiconductor switch and includes a main switch 31 that supplies power to the load 50 and a sense transistor (a current detection means) 32 that detects a load current (flowing current) I. The main switch 31 and the sense transistor 32 are configured of an N-channel type field effect transistor (FET) as shown in, for example, FIG. 1.

The power-supply-path protection circuit 20 includes a power supply determination control circuit 21, a wire temperature calculation circuit 22, a current detection circuit (a current detection means) 23 and an ambient temperature sensor (a temperature detection means) 24 and permits power supply by the switch circuit 30 according to the power supply command signal Stn and, if the temperature of the power supply path 51 (hereinafter referred to as "wire temperature") Tw reaches a predetermined upper limit value Tsm, inhibits power supply by the switch circuit 30 so that the power supply path 51 is protected.

The power-supply-path protection circuit 20 protects at least one of the printed wiring portion 51A and the wire 51B. Although the present embodiment exemplifies protection of the wire 51B, the present invention is not limited to it. For example, the power-supply-path protection circuit 20 may protect the printed wiring portion 51A or both of the printed wiring portion 51A and the wire 51B.

Further, in a case where power supply by the switch circuit 30 is inhibited (shut off), the power-supply-path protection circuit 20 removes inhibition of power supply by the switch circuit 30 if the wire temperature Tw is decreased to a predetermined threshold temperature Tth. That is, in the present embodiment, shut off power supply is recovered on the basis of the wire temperature Tw.

The current detection means includes the current detection circuit 23 and the sense transistor 32, to detect the load current I flowing to the wire 51B via the switch circuit 30. The current detection circuit 23 multiplies a sensed current detected by the sense transistor 32 by a predetermined number to provide a converted load current (flowing current) I. Information of the flowing current I is provided to the wire temperature calculation circuit 22.

The ambient temperature sensor 24 is provided near, for example, the wire temperature calculation circuit 22 to detect an ambient temperature Ta in, for example, the engine room of the automobile. Information of the detected ambient temperature Ta is provided to the wire temperature calculation circuit 22. The ambient temperature Ta is not limited to the temperature in the engine room.

The wire temperature calculation circuit 22 calculates and estimates a increase in the wire temperature ΔTw from the ambient temperature Ta based on a difference between heat generation from the wire 51B due to the flowing current I and heat dissipation from the wire 51B. Then, the wire temperature calculation circuit 22 adds the calculated increase in the wire temperature ΔTw to the ambient temperature Ta to obtain a calculated wire temperature Tw. The wire temperature calculation circuit 22 provides information of the calculated increase in the wire temperature ΔTw and wire temperature Tw to the power supply determination control circuit 21.

Here, the wire temperature calculation circuit 22 samples, for example, the flowing current I at every predetermined time Δt and substitutes a value of each flowing current I into the following equation (1) to calculate the increase in the wire temperature ΔTw.

$$\Delta Tw(n) = \Delta Tw(n-1) \times \exp(-\Delta t/\tau w) + Rthw \times Rw(n-1) \times I(n-1)^2 \times (1 - \exp(-\Delta t/\tau w)) \quad (1)$$

where I(n): detected flowing current value (A) detected in the $n^{th}$ detection (n: 1 or larger integer);

ΔTw(n): increase in the wire temperature (° C.) in the $n^{th}$ detection;

$$Rw(n) = Rw(0) \times (1 - xw \times (Tw - To))$$

: wire resistance (Ω) in the $n^{th}$ detection;

Rw(0): wire resistance (Ω) at a predetermined reference temperature To;

Rthw: thermal resistance of the wire (° C./W);

τw: thermal time constant of the wire(s); and xw: resistance temperature coefficient of the wire (/° C.).

In equation (1), the first term excluding the flowing current I indicates the heat dissipation from the power-supply path 51, and the second term including the flowing current I indicates the heat generation in the power-supply path 51. When the current supplied to the load 50 is shut off and no flowing current I is present, the wire temperature Tw is determined based on the heat dissipation from the power-supply path 51.

The power supply determination control circuit 21 controls the switching of the power supply by the switch circuit 30 according to the power supply command signal Stn from the SW input detection, circuit 40 and, if the wire temperature Tw reaches a predetermined upper limit value Tsm, inhibits power supply by the switch circuit 30. Here, the upper limit value Tsm of the wire temperature Tw is assumed to be a wire smoking temperature. That is, if the wire temperature Tw reaches the wire smoking temperature Tsm, the power supply determination control circuit 21 inhibits power supply to the load 50 by turning off the main switch 31 in the switch circuit 30 in order to protect the wire 51B. As a result, it is possible to suitably prevent smoking of the wire 51B and tolerate power supply to a temperature near the smoking temperature Tsm.

Further, if the power supply is shut off by turning off the switch circuit 30, the power supply determination control circuit 21 removes inhibited power supply by the switch circuit 30 if the wire temperature Tw decreases to the predetermined threshold temperature Tth.

2. Basic Operations of Power Supply Controller

Next, a description will first be given of basic operations of the power supply controller 10 in the present embodiment with reference to the timing chart in FIG. 2. At the bottom of FIG. 2, for comparison, an example is shown where power supply is not recovered on the basis of the wire temperature Tw, in contrast to the present embodiment.

It is now assumed that at time to in FIG. 2 at which the load 50 is at rest, the input switch SW is turned on to start power supply to the load 50. Then, in response to the turning-on of the input switch SW, the SW input detection circuit 40 feeds the output command signal (power supply command signal) Stn to the power supply determination control circuit 21.

In response to the output command signal Stn, the power supply determination control circuit 21 generates the power supply control signal Scn which turns on the main switch 31 in the switch circuit 30, thereby turning on the main switch 31. Then, the flowing current I is supplied from the battery Ba to the load 50, to raise the wire temperature Tw from the ambient temperature Ta.

That is, in response to the command to carry a current to the load 50, the sense transistor 32 and the current detection circuit 23 detect the load current I and the ambient temperature sensor 24 detects the ambient temperature Ta. Further, the wire temperature calculation circuit 22 calculates an increase in the wire temperature ΔTw from the ambient temperature Ta based on Equation 1 and adds the increase in the wire temperature ΔTw to the ambient temperature Ta to obtain a calculated wire temperature Tw.

In FIG. 2, as the value of the flowing current I, a short-circuit current Is which occurs if the wire 51B is short-circuited and a normal current In which flows during normal time are shown. That is, FIG. 2 shows a case where the wire 51B is short-circuited at time t0.

When the short circuit in the power-supply path 51 is removed at time t1 in FIG. 2, the flowing current I decreases from the short-circuit current Is to the normal current In. At that time, an amount of heat dissipation from the power-supply path 51 is larger than an amount of heat generation due to the flowing current I. Therefore, the calculated wire temperature Tw decreases.

Subsequently, if the flowing current I increases from the normal current In to the short-circuit current Is again at time t2 in FIG. 2, the wire temperature Tw also increases. Then, if the input switch SW is turned off at time t3 in FIG. 2, the SW input detection circuit 40 supplies the power supply determination control circuit 21 with the output command signal Stn for stopping the flowing current I. In response to the output command signal Stn, the power supply determination control circuit 21 generates the power supply control signal Scn which inhibits power supply by the main switch 31, so that the main switch 31 is turned off by the power supply control signal Scn. That shuts off the flowing current I to the load 50, thereby decreasing the calculated wire temperature Tw.

Subsequently, if the input switch SW is turned on again at time t4 in FIG. 2, the input detection circuit 40 supplies the power supply determination control circuit 21 with the output command signal Stn for driving the flowing current I similar to the case at time to. In response to the output command signal Stn, the power supply determination control circuit 21 turns on the main switch 31. Then, the wire temperature Tw which is calculated corresponding to the flowing current I increases from the current temperature.

Then, for example, in a case where the wire temperature Tw reaches the wire smoking temperature Tsm at time t5 in FIG. 2, in the present embodiment, even if the input switch SW is in the on-state, the power supply determination control circuit 21 turns off, (shut off) the main, switch 31 to inhibit power supply to the load 50 so that the wire 51B is protected. Due to power supply inhibition, the wire temperature Tw decreases to avoid the wire 51B from smoking, thereby protecting it appropriately.

From time t5 onward, the switch circuit 30 stays in a latch (power supply-inhibited) state, to decrease the wire temperature Tw. In the latch state, the switch circuit 30 is turned off irrespective of whether the input switch SW is turned on or off. Therefore, after time t6 in FIG. 2, even if the input switch SW is turned on/off repeatedly, in the present embodiment, the power supply to the load 50 is not permitted and the wire temperature Tw further decreases.

Then, if the wire temperature Tw decreases to the predetermined threshold temperature Tth or lower and the increase in the wire temperature ΔTw is equal or less than an increase for determination (which corresponds to "predetermined temperature value") ΔT_lower at time t7 in FIG. 2, the power supply determination control circuit 21 turns on the main switch 31 to restart the power supply to the load 50. That is, power supply to the load 50 shut off at time t5 in FIG. 2 is recovered at time t7 when the wire temperature Tw decreases to the predetermined threshold temperature Tth or less.

Here, the threshold temperature Tth is set to a value obtained by adding the predetermined temperature value (increase for determination ΔT_lower) to the ambient temperature Ta. Therefore, by appropriately setting the predetermined temperature value ΔT_lower corresponding to how the power supply controller 10 is set up, it is possible to appropriately adjust a balance between timing at which power supply to the load 50 is recovered, that is, a recovery point in time, and reliabilities for wire protection. For example, to weigh the wire protection reliabilities, the threshold temperature Tth may be set to a value near the ambient temperature Ta. That is, a predetermined addend temperature (increase for determination ΔT_lower) may be set low, for example, to a point between 3° C. and 0.1° C., If the wire temperature Tw reaches the wire smoking temperature Tcm at time t5 in the comparative example at the bottom of FIG. 2, the switch circuit 30 is not latched in contrast to the present embodiment. Therefore, at time t5, power supply to the load 50 is shut off; however, from time t6 onward in FIG. 2, the main switch 31 is turned on/off in response to the turning-on/off of the input switch SW. Correspondingly, the flowing current I flows, so that the wire temperature Tw increases and falls repeatedly near the wire smoking temperature Tcm. Therefore, in this case, the wire is subjected to a temperature near the smoking temperature for a long time and may possibly degrade.

3. In a Case where the Load is a Motor

Next, a description will be given of operations of the power supply controller 10 having the basic operations, in particular, in a case where the fan motor 50, which is the load, is locked, with reference to the timing chart in FIG. 3. In the present embodiment, as the wire 51B, a wire that is thinner than ordinary wires used for supply of power to the fan motor 50 is used. At the bottom of FIG. 3, an example is shown in which an ordinary wire (which is thicker than that in the present embodiment) which can withstand a lock current Ick during an assumed period of time is used as the wire 51B.

Assume now that the input switch SW is turned on to start the power supply to the fan motor 50 at time t10 in FIG. 3 when the fan motor 50 is locked with a twig. Then, similar to the case in FIG. 2, in response to the turning-on of the input switch SW, the power supply determination control circuit 21 generates the power supply control signal Scn which turns on the main switch 31 in the switch circuit 30, to turn on the main switch 31. Then, here, the flowing current I, which is the lock current Ick is supplied from the battery Ba to the load 50, so that the wire temperature Tw increases from the ambient temperature Ta rapidly.

Then, in a case where the wire temperature Tw reaches the wire smoking temperature Tsm at time t11 in FIG. 3, in the present embodiment, even if the input switch SW is in the on-state, the power supply determination control circuit 21 turns off (shuts off) the main switch 31 to inhibit power supply to the fan motor 50 so that the wire 51B is protected. Due to inhibition of power supply, the wire temperature Tw decreases to avoid the wire 51B from smoking and protect it appropriately. Then, the main switch 31 is latched to then the wire temperature Tw decreases.

In a case where the ordinary wire is used, the wire temperature Tw does not reach the wire smoking temperature Tsm during a period from time t10 to time t11. Therefore, as denoted by a bold broken line in FIG. 3, the lock current Ick continues to flow without being shut off.

Subsequently, if the wire temperature Tw decreases to the predetermined threshold temperature Tth or less to decrease the increase in the wire temperature ΔTw to the increase for determination ΔT_lower or less at time t12 in FIG. 3, the power supply determination control circuit 21 turns on the main switch 31 to restart the power supply to the load 50. Specifically, power supply to the fan motor 50 is recovered at time t12 in FIG. 3.

Then, the lock current Ick flows again to raise the wire temperature Tw. In a case where the wire temperature Tw reaches the wire smoking temperature Tsm at time t13, even if the input switch SW is in the on-state again, the power supply determination control circuit 21 turns off (shuts off) the main switch 31 to inhibit power supply to the fan motor 50 so that the wire 51B is protected. Due to inhibition of power supply, the wire temperature Tw decreases.

In a case where the ordinary wire is used, the wire temperature Tw increases but not reaches the wire smoking temperature Tsm. Therefore, the lock current Ick further continues to flow.

Subsequently, assume that the motor is released from the lock state at time t14. Then, in a case where the wire temperature Tw decreases again to the predetermined threshold temperature Tth or lower at time t15, the power supply determination control circuit 21 turns on the main switch 31 to start the power supply to the load 50. That is, power supply to the fan motor 50 is recovered again at time t15 in FIG. 3. In this case, a rush current flows; however, soon the normal current In is recovered, so that the wire temperature Tw becomes the normal temperature.

In a case where the ordinary wire is used, the motor is released from the lock state at time t14, so that then the wire temperature Tw decreases.

4. Effects of the Present Embodiment

As described above, in the present embodiment, once shut off power supply is recovered on the basis of the wire temperature Tw without using a timer circuit for measuring the shutoff time. Therefore, it is possible to easily recover the once shut off power supply while protecting the wire 51B securely. At the same time, safe another power supply can be secured by setting the threshold temperature Tth, that is, the increase for determination ΔT_lower to a temperature at which a sufficient cooling period for the wire 51B can be ensured.

Further, in a case where the power supply controller 10 of the present invention is applied to the fan motor 50 or the like to be locked, even if the lock current Ick flows, safe recovery conditions (sufficient cooling of the wire 51B) can be provided. Therefore, it is possible to use the wire 51B which is thinner than the conventional wire. As a result, in a case where the power supply controller 10 is mounted on a vehicle, it is possible to reduce the weight of the wire harness of the vehicle, eventually reducing the weight of the vehicle.

Other Embodiments

The present invention is not limited to the above description and the drawings but covers, for example, the following embodiments in its technical scope of the present invention, (1) Although in the present embodiment the example has been described of recovering power supply on condition that the wire temperature Tw decreases to the predetermined threshold temperature Tth, the present invention is not limited to it. Furthermore, in a case where power supply by the switch circuit 30 is inhibited, the inhibited power supply by the switch circuit 30 may be removed (removed from the latch state) if the power supply command signal Stn which commands to terminate the power supply to the load 50 is received. In this case, if a trouble occurs when the power supply recovers automatically only because the wire temperature Tw has decreased to the predetermined threshold temperature Tth, for example, if the temperature repeatedly increases again because the cause of an increase in temperature of the power supply path is unclear, the power supply can be recovered safely after the cause is removed.

Further, in a case where the power supply by the switch circuit 30 is inhibited, the following conditions may be considered as the conditions (latch-state releasing conditions) for releasing the inhibited power supply by the switch circuit 30 if the power supply command signal Stn which commands to terminate the power supply to the load 50 is received.

For example, it may be removed on condition that the input switch SW is turned of a predetermined number of times, for example, 3, 5, or 10 times. In other words, it may be removed if the power-supply-path protection circuit 20 receives the power supply command signal Stn which commands to terminate the power supply to the load by the predetermined number of times.

Alternatively, in a case where the power supply controller is mounted on a vehicle, it may be removed on condition that an ignition (IG) switch of the vehicle is turned off. In other words, if the SW input detection circuit 40 receives a signal from the 1G switch of the vehicle (see FIG. 1), the SW input detection circuit 40 generates the power supply command signal Stn in response to the turning-off of the IG switch of the vehicle. Further, the power-supply-path protection circuit 20 may be arranged to remove the inhibited power supply by the switch circuit 30 based on the power supply command signal Stn which is received when the ignition switch is turned off.

Further, in a case where the power supply controller has a function of providing a startup state from a sleep mode (Wake-up function), it may be removed on condition that the power supply controller has woken up from the sleep mode. In other words, the power-supply-path protection circuit 20 may remove the inhibited power supply by the switch circuit 30 if it is woken up from the sleep mode in a case where power supply by the switch circuit 30 is inhibited.

Here, the sleep mode refers to a state where the functions of the power supply controller are stopped except for the function of releasing the sleep mode, to suppress a current dissipation of the power supply controller. In the sleep mode, for example, if the input signal (wake-up signal) Sin is received by the SW input detection circuit 40, the power supply controller is woken up to enter a normal operation state. The wake-up signal is not limited to the input signal Sin.

By limiting releasing of the latch state by thus adding the conditions fox releasing the inhibited power supply by the switch circuit 30 (latch-state releasing conditions), the number of times of releasing the latch-state can be reduced and the deterioration of the power supply path Si can be reduced.

(2) Although in the present embodiment the example has been described of setting the threshold temperature Tth to the value obtained by adding the predetermined temperature value (increase for determination ΔT_lower) to the ambient temperature Ta, the present invention is not limited to it. The threshold temperature Tth may be set as a predetermined constant temperature which does not depend on the ambient temperature Ta. In this case also, the reliabilities of protection of the wire can be ensured.

(3) Although in the above embodiment, the current detection means includes the current detection circuit 23 and the sense transistor 32, the present invention is not limited to it. The flowing current may be detected, for example, by using a shunt resistor or based on a drain-source voltage Vds of the main switch (N-channel type FET).

(4) Although in the above embodiment, the example has been described of constituting each circuit in the power supply controller 10 as a discrete circuit, the present invention is not limited to it For example, the power-supply-path protection circuit 20 and the SW input detection circuit 40 except for the ambient temperature sensor 24 may each be constituted of an application specific integrated circuit (ASIC).

The invention claimed is:

1. A power supply controller to be connected to a power supply path for supplying power from a power source to a load, the power supply controller being configured to control power supply from the power source to the load and comprising:
    a switch circuit to be provided between the power source and the power supply path, the switch circuit being configured to switch the power supply from the power source to the load between on and off; and
    a power-supply-path protection circuit configured to control switching operation of the switch circuit according to a power-supply command signal that commands to start or terminate the power supply to the load, to calculate a temperature of the power-supply path, and if the calculated temperature reaches a predetermined upper limit, to inhibit the switch circuit from the power supply, thereby protecting the power-supply path,
    wherein in a case where the power supply by the switch circuit is inhibited, if the temperature of the power supply path decreases to a predetermined threshold temperature, the power-supply-path protection circuit removes inhibition of the power supply by the switch circuit.

2. The power supply controller according to claim 1, wherein the power-supply-path protection circuit includes:
    a current detection means configured to detect a flowing current flowing through the load;
    a temperature detection means configured to detect an ambient temperature;
    a wire temperature calculation circuit configured to calculate an increase in temperature of the power-supply path from the ambient temperature based on a difference between heat generation in the power-supply path due to the flowing current flowing through the power-supply path and heat dissipation from the power supply path, and to calculate the temperature of the power supply path by adding the increase in temperature of the power supply path to the ambient temperature; and
    a power supply determination control circuit configured to control switching of the power supply by the switch circuit according to the power supply command signal and, if the temperature of the power supply path reaches a predetermined upper limit, to inhibit the power supply by the switch circuit.

3. The power supply controller according to claim 1, wherein the threshold temperature is set by adding a predetermined temperature to the ambient temperature.

4. The power supply controller according to claim 1, wherein the predetermined upper limit value is a smoking temperature of the power supply path.

5. The power supply controller according to claim 1, wherein the power supply controller controls the power supply to a motor as the load.

6. The power supply controller according to claim 1, wherein if the power-supply-path protection circuit receives the power supply command signal which commands to terminate the power supply to the load in case the power supply by the switch circuit is inhibited, the power-supply-path protection circuit removes the inhibition of the power supply by the switch circuit.

7. The power supply controller according to claim 6, wherein if the power-supply-path protection circuit receives, a predetermined number of times, the power supply command signal which commands to terminate the power supply to the load in case the power supply by the switch circuit is inhibited, the power-supply-path protection circuit removes the inhibition of the power supply by the switch circuit.

8. The power supply controller according to claim 6, wherein
    the power supply controller is mounted on a vehicle; and
    if an ignition switch of the vehicle is turned off in case the power supply by the switch circuit is inhibited, the power-supply-path protection circuit removes the inhibition of the power supply by the switch circuit.

9. The power supply controller according to claim 1 wherein
    the power supply controller has a sleep mode and a wake-up function to start a normal operation state from the sleep mode; and
    if the power-supply-path protection circuit wakes up from the sleep mode in case the power supply by the switch circuit is inhibited, the power-supply-path protection circuit removes the inhibition of the power supply by the switch circuit.

10. The power supply controller according to claim 1, wherein
    the power supply controller is formed on a printed circuit board;

the power supply path includes a printed wiring portion formed on the printed circuit board and a wire portion which connects the printed wiring portion to the load to each other; and the power-supply-path protection circuit protects at least one of the printed wiring portion and the wire portion.

* * * * *